(12) United States Patent
Schoepke et al.

(10) Patent No.: US 7,601,397 B2
(45) Date of Patent: Oct. 13, 2009

(54) COPOLYMERS AND THEIR USE FOR TREATING FLEXIBLE SUBSTRATES

(75) Inventors: Holger Schoepke, Neckargemuend (DE); Stefan Adams, Ludwigshafen (DE); Helfried Scheidl, Friedelsheim (DE); Bruno Hofer, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 312 days.

(21) Appl. No.: 11/569,685

(22) PCT Filed: Jun. 2, 2005

(86) PCT No.: PCT/EP2005/005925
§ 371 (c)(1),
(2), (4) Date: Nov. 28, 2006

(87) PCT Pub. No.: WO2005/118661
PCT Pub. Date: Dec. 15, 2005

(65) Prior Publication Data
US 2007/0254108 A1     Nov. 1, 2007

(30) Foreign Application Priority Data
Jun. 4, 2004    (DE) ................. 10 2004 027 415

(51) Int. Cl.
*B05D 3/02*    (2006.01)

(52) U.S. Cl. .............. 427/384; 427/385.5; 427/389; 427/389.9; 427/391; 427/392; 427/394; 427/395; 427/396

(58) Field of Classification Search ................. None
See application file for complete search history.

(56) References Cited

U.S. PATENT DOCUMENTS 143,971 A    10/1873    Eaton (Continued)

FOREIGN PATENT DOCUMENTS

DE    26 17 243    11/1977

(Continued)

OTHER PUBLICATIONS

Anonymos: "Ultrahol® Strong", ASF Cosmetic Solutions, 'online! 2004, XP-002345939, Retrieved from the Internet: URL:http://www.cosmetics.basf.de/(ofnv5uj3xy3zfy45hgiburu3)/product_detail.aspx?PrID=Ultrahold+Strong&GrpID=243&GrpID2, 'retrieved on Aug. 30, 2005!.

(Continued)

*Primary Examiner*—Erma Cameron
(74) *Attorney, Agent, or Firm*—Oblon, Spivak, McClelland, Maier & Neustadt, L.L.P.

(57) ABSTRACT

Copolymers prepared by copolymerization of
(a) a total of from 3.5 to 20% by weight of at least one polymerizable acid selected from
(a1) ethylenically unsaturated $C_3$-$C_{10}$-monocarboxylic acid and
(a2) ethylenically unsaturated $C_4$-$C_{10}$-dicarboxylic acid or their anhydrides,
(b) from 4 to 10% by weight of at least one compound of the general formula I

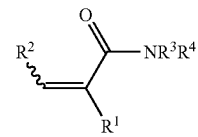

the sum of (a) and (b) being in the range from 7.5 to 24% by weight,
(c) from 60 to 92.5% by weight of at least one compound of the general formula II

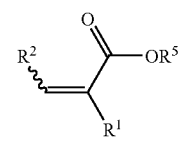

(d) from 0 to 0.5% by weight of at least one compound of the general formula III

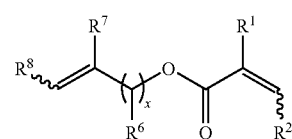

(e) from 0 to 10% by weight of (meth)acrylonitrile,
(f) from 0 to 10% by weight of at least one conjugated diolefin,
(g) from 0 to 10% by weight of at least one vinylaromatic compound of the general formula IV

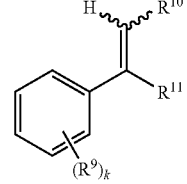

the variables being defined as follows:
$R^1$ and $R^2$ are identical or different and are selected from hydrogen and $C_1$-$C_{10}$-alkyl,
$R^3$ and $R^4$ are identical or different and are selected from hydrogen, $C_1$-$C_{20}$-alkyl, phenyl, or $R^3$ and $R^4$ together are $C_2$-$C_{10}$-alkylene, substituted or unsubstituted,
$R^5$ is selected from $C_1$-$C_{20}$-alkyl and phenyl,
$R^6$, $R^7$, $R^8$, $R^9$, $R^{10}$ and $R^{11}$ are identical or different and are selected from hydrogen and $C_1$-$C_{10}$-alkyl,
x is an integer in the range from 0 to 12,
y is selected from 0 and 1, x being chosen to be not equal to 0 when y is 1,
k is an integer in the range from 0 to 3,
it being possible for the copolymers to be completely or partly neutralized with alkali or ammonium and
data in % by weight being based in each case on the total copolymer.

16 Claims, No Drawings

U.S. PATENT DOCUMENTS

| | | | |
|---|---|---|---|
| 4,128,520 A | 12/1978 | Barabas et al. | |
| 4,918,139 A | 4/1990 | Cuirassier et al. | |
| 5,087,646 A | 2/1992 | Tork et al. | |
| 2004/0245490 A1* | 12/2004 | Schopke et al. | 252/8.57 |

FOREIGN PATENT DOCUMENTS

| | | |
|---|---|---|
| DE | 28 06 646 | 8/1978 |
| DE | 40 03 442 | 8/1991 |
| DE | 41 42 240 | 6/1993 |
| DE | 42 31 034 | 3/1994 |
| EP | 0 184 153 | 6/1986 |
| EP | 0 324 416 | 7/1989 |
| EP | 0 547 430 | 6/1993 |
| EP | 0 697 424 | 2/1996 |
| WO | 88/02759 | 4/1988 |
| WO | 96/25863 | 8/1996 |

OTHER PUBLICATIONS

Anonymos: "Luvimer® 100 P", ASF Cosmetic Solutions, 'online? 2004, XP-002345945, Retrieved from the internet: URL:http://www.cosmetics.basf.de/(ofnv5uj3xy3zfy45hgiburu3)/product_detail.aspx?PRID=Luvimer+100 +P&GrpID=240&GrpID2, 'retrieved on Aug. 30, 2005!.

* cited by examiner

COPOLYMERS AND THEIR USE FOR TREATING FLEXIBLE SUBSTRATES

The present invention relates to copolymers prepared by copolymerization of (a) a total of from 3.5 to 20% by weight of at least one polymerizable acid selected from
  (a1) ethylenically unsaturated $C_3$-$C_{10}$-monocarboxylic acids and
  (a2) ethylenically unsaturated $C_4$-$C_{10}$-dicarboxylic acids or their anhydrides,
(b) from 4 to 10% by weight of at least one compound of the general formula I

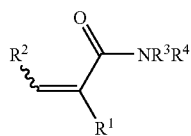

I the sum of (a) and (b) being in the range from 7.5 to 24% by weight,
(c) from 60 to 92.5% by weight of at least one compound of the general formula II

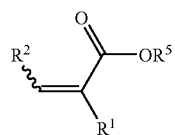

II (d) from 0 to 0.5% by weight of at least one compound of the general formula III

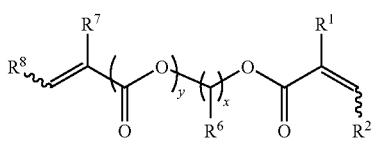

III (e) from 0 to 10% by weight of (meth)acrylonitrile,
(f) from 0 to 10% by weight of at least one conjugated diolefin,
(g) from 0 to 10% by weight of at least one vinylaromatic compound of the general formula IV

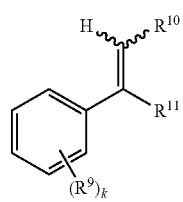

IV the variables being defined as follows:
$R^1$ and $R^2$ are identical or different and are selected from hydrogen and $C_1$-$C_{10}$-alkyl,
$R^3$ and $R^4$ are identical or different and are selected from hydrogen, $C_1$-$C_{20}$-alkyl and phenyl, or $R^3$ and $R^4$ together are $C_2$-$C_{10}$-alkylene, substituted or unsubstituted,
$R^5$ is selected from $C_1$-$C_{20}$-alkyl and phenyl,
$R^6$, $R^7$, $R^8$, $R^9$, $R^{10}$ and $R^{11}$ are identical or different and are selected from hydrogen and $C_1$-$C_{10}$-alkyl,
x is an integer in the range from 0 to 12,
y is selected from 0 and 1, x being chosen to be not equal to 0 when y is 1,
k is an integer in the range from 0 to 3, it being possible for the copolymers to be completely or partly neutralized with alkali or ammonium and data in % by weight being based in each case on the total copolymer.

The present invention furthermore relates to aqueous dispersions of the copolymers according to the invention. The present invention furthermore relates to the use of the aqueous dispersions according to the invention for coating flexible substrates, in particular leather and imitation leathers, and a process for coating flexible substrates, in particular leather and imitation leathers, using aqueous dispersions according to the invention. The present invention furthermore relates to coated flexible substrates and the use of coated flexible substrates according to the invention.

Copolymers of acrylates have numerous applications, in particular as binder for coating a very wide range of substrates. Binders decisively influence the mechanical properties of coated substrates. Depending on the manner in which binders are prepared, coated flexible substrates may have a surface having a fairly hard or soft feel.

When leather or imitation leathers are coated, for example during finishing, an artificial grain is embossed onto the finished leather in many cases, particularly when it was not possible to use the natural grain. Binders for flexible substrates, such as leather or imitation leathers, have to meet particularly demanding requirements. The embossing process is decisively influenced by the properties of the finish. What is desired is that embossing can be effected as quickly as possible at temperatures above 90° C. or even better above 100° C. without the embossing tools sticking and without the finish having cuts. The binder or binders is or are of considerable importance thereby Binders known to date are still in need of improvement with regard to the tack at temperatures of 100° C. or more and with regard to cutting during embossing.

DE 26 17 243 A discloses that itaconic acid/acrylate copolymers comprising acid in the range of from 0.5 to 3% altogether (itaconic acid and, if appropriate, other unsaturated acids) can be prepared. Such copolymers are suitable for preparing cellular foams. In order to ensure as low a tack as possible, DE 26 17 243 recommends using itaconic acid and, if appropriate, other unsaturated acids in the range of from 0.5 to 3% altogether (page 5, second paragraph).

WO 88/02759 discloses that unsaturated dicarboxylic acids such as, for example, itaconic acid, can be copolymerized with acrylates, such as, for example, butyl acrylate, and, if appropriate, comonomers capable of crosslinking, such as methylolacrylamide. A multistage process (page 3, 2nd paragraph) is preferably employed, in which comonomers differing from itaconic acid are initially taken and the itaconic acid is added only during the polymerization. However, the mechanical properties are still inadequate in the coating of numerous flexible substrates. In particular, the tack is still unsatisfactory. In addition, WO 88/02759 discloses that methylolacrylamide is a particularly suitable comonomer which is suitable for crosslinking coatings by the process demonstrated in WO 88/02759. In any case, the crosslinking is based on the elimination of formaldehyde and the further reaction of the formaldehyde produced in situ. However, formaldehyde is no longer accepted in numerous crosslinked substrates.

U.S. Pat. No. 5,143,971 discloses that itaconic acid can be copolymerized with one or more alkyl (meth)acrylates by initially taking at least half of the itaconic acid to be polymerized and adding a feed, which comprises substantially alkyl (meth)acrylates and, if appropriate, further itaconic acid, during the polymerization. Copolymers having a glass transition temperature in the range from −20 to −60° C. and which can be processed to give films are obtained. However, the mechanical properties are still not adequate in the coating of numerous flexible substrates.

EP 0 324 416 B1 discloses binders which, in addition to other comonomers, from 0.5 to 5% by weight of α,β-monoolefinically unsaturated mono- and/or dicarboxylic acids generally comprising from 3 to 5 carbon atoms and furthermore amides thereof and the use of the binders cured with the zinc-amine-polycarboxylic acid complexes in resilient coatings, such as roof skins and crack-covering systems. However, the binders disclose and comprising 3% by weight of acrylic acid and 1% by weight of acrylamide are inadequate with regard to the embossability in the coating of numerous flexible substrates and in particular leather.

EP 0 547 430 discloses aqueous polymer dispersions and the use thereof for coating leather. The polymer dispersions disclosed are obtainable by emulsion polymerization at temperatures in the range from ≧0° C. to ≦50° C. and comprise from 1 to 10% by weight of at least one monomer selected from α,β-monoethylenically unsaturated mono- and dicarboxylic acids, the anhydrides thereof and the diamides thereof. Copolymers which comprise 1% by weight of acrylamide and 3% by weight of acrylic acid incorporated in the form of polymerized units are disclosed by way of example. If leather is coated with such dispersions, leather having good dry flexing endurance and high-temperature lightfastness is obtained. The embossability, in particular at temperatures above 90° C. or even better above 100° C., can, however, still be improved.

It was the object to provide copolymers which are suitable for coating flexible substrates and which do not have the disadvantages known from the prior art. It was in particular the object to provide copolymers which are suitable for coating flexible substrates and which can be readily embossed even at temperatures of 90° C. or even better above 100° C. without becoming tacky. It was furthermore the object to provide aqueous dispersions of copolymers. It was furthermore the object to provide a process for the preparation of copolymers which are suitable for coating flexible substrates. It was furthermore the object to provide a process for coating flexible substrates. Finally, it was the object to provide coated flexible substrates.

Accordingly, copolymers defined at the outset were found. Copolymers according to the invention are obtained by copolymerization of the following comonomers:

(a) a total of from 3.5 to 20% by weight, preferably up to 10, particularly preferably from 4 to 6.5, % by weight, of at least one polymerizable acid selected from
(a1) ethylenically unsaturated $C_3$-$C_{10}$-monocarboxylic acids, in particular acrylic acid, methacrylic acid and (E) and (Z) crotonic acid, and
(a2) ethylenically unsaturated $C_4$-$C_{10}$-dicarboxylic acids or their anhydrides, for example maleic acid, fumaric acid, metaconic acid, citraconic acid, itaconic acid, maleic anhydride, itaconic anhydride, preferably at least one ethylenically unsaturated $C_5$-dicarboxylic acid, for example metaconic acid, citraconic acid or itaconic acid.

If it is desired to use at least two polymerizable acids, for example methacrylic acid and itaconic acid, the data from 3.5 to 20% by weight, preferably up to 10, particularly preferably from 4 to 6.5, % by weight, of polymerizable acid are based in each case on the sum of all polymerizable acids.

(b) from 4 to 10% by weight, preferably from 5 to 8% by weight, of at least one compound of the general formula I

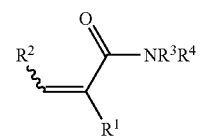

the sum of (a) and (b) being in the range from 7.5 to 24% by weight, preferably in the range from 9 to 15% by weight, (c) from 60 to 92.5% by weight, preferably from 60 to 91% by weight, of at least one compound of the general formula II

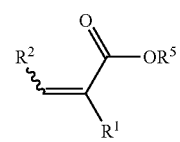

(d) from 0 to 0.5% by weight, preferably from 0.01 to 0.4% by weight and particularly preferably from 0.05 to 0.2% by weight of at least one compound of the general formula III

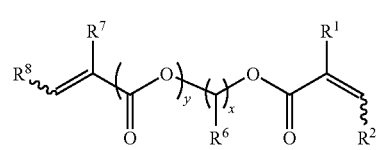

(e) from 0 to 10% by weight, preferably up to 7% by weight, of (meth)acrylonitrile, (f) from 0 to 10% by weight, preferably up to 8% by weight, of at least one conjugated diolefin, for example isoprene and in particular 1,3-butadiene, (g) from 0 to 10% by weight, preferably from 0.1 to 8% by weight, of at least one vinylaromatic compound of the general formula IV

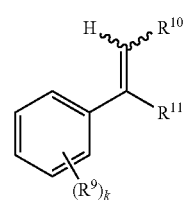

the variables being defined as follows:
$R^1$ and $R^2$ are identical or different and, independently of one another, are selected from $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl, particularly preferably $C_1$-$C_4$-alkyl, such as methyl, ethyl, n-propyl, isopropyl, n-butyl, isobutyl, sec-butyl and tert-butyl; or hydrogen, very particularly preferably hydrogen and methyl;

$R^3$ and $R^4$ are identical or different and are selected from $C_1$-$C_{20}$-alkyl, for example n-undecyl, n-dodecyl, n-tridecyl, n-tetradecyl, n-pentadecyl, n-hexadecyl, n-heptadecyl, n-octadecyl, n-nonadecyl and n-eicosyl; preferably $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl; particularly preferably n-butyl, ethyl and 2-ethylhexyl, phenyl, or $R^3$ and $R^4$ together are a $C_2$-$C_{10}$-alkylene group which may be monosubstituted or polysubstituted or unsubstituted, for example by one or more $C_1$-$C_4$-alkyl groups or one or more $C_6$-$C_{14}$-aryl groups. The following may be mentioned by way of example:
—$CH_2$—$CH_2$—, —$(CH_2)_3$—, —$(CH_2)_4$—,
—$(CH_2)_5$—, —$(CH_2)_6$—, —$(CH_2)_7$—, —$(CH_2)_8$—,
—$(CH_2)_9$—, —$(CH_2)_{10}$—,
—$CH_2$—$CH(CH_3)$—, —$CH_2$—$CH(C_2H_5)$—, —$CH_2$—$CH(iso$-$C_3H_7)$—,
—$CH_2$—$CH(tert.$-$C_4H_9)$—, —$CH_2$—$CH(C_6H_5)$—, syn- und anti-$CH(CH_3)$—$CH(CH_3)$—, syn- and anti-$CH(CH_2CH_5)$—$CH(C_2H_5)$—, syn- und anti-$CH(C_6H_5)$—$CH(C_6H_5)$—,
—$CH_2$—$C(CH_3)_2$—$CH_2$—, —$C(CH_3)_2$—$C(CH_3)_2$—, —$C(CH_3)_2$—$CH_2$—$C(CH_3)_2$—,
—$CH(CH_3)_2$—$CH(C_6H_5)$—, —$CH_2$—$CH(CH_3)$—$CH_2$—, —$CH_2$—$CH(tert.$-$C_4H_9)$—$CH_2$—;

$R^5$ is selected from $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl, particularly preferably $C_1$-$C_4$-alkyl, such as methyl, ethyl, n-propyl, isopropyl, n-butyl, isobutyl, sec-butyl and tert-butyl, or phenyl, $R^6$, $R^7$, $R^8$, $R^9$, $R^{10}$ and $R^{11}$ are identical or different and, independently of one another, are selected from $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl, particularly preferably $C_1$-$C_4$-alkyl, such as methyl, ethyl, n-propyl, isopropyl, n-butyl, isobutyl, sec-butyl and tert-butyl, or in particular hydrogen, very particularly preferably $R^6$ and $R^{11}$ are selected from hydrogen and methyl, and very particularly preferably $R^6$, $R^7$ and $R^8$ are in each case identical and are hydrogen.

k is an integer in the range from 0 to 3, preferably 1 and particularly preferably zero, x is an integer in the range from 0 to 12, preferably from 1 to 10.

y is an integer and is selected from 0 and 1.

x is not equal to 0 when y is 1; preferably x is selected from 1, 2, 3, 4, 6, 8 and 10 when y is 1. Preferably x is selected from 0 and 1 when y is 0.

Data in % by weight are based in each case on total copolymer according to the invention.

The sum of (a) and (b) is in the range from 7.5 to 24% by weight, preferably in the range from 9 to 15% by weight.

If it is desired to use, for example, a plurality of compounds of the general formula II as comonomers, the sum of all comonomers which are compounds of the formula II is in the range from 60 to 92.5% by weight.

In a preferred embodiment of the present invention, an ethylenically unsaturated $C_3$-$C_{10}$-monocarboxylic acid (a1) is methacrylic acid.

In a preferred embodiment of the present invention, an ethylenically unsaturated $C_4$-$C_{10}$-dicarboxylic acid (a2) is itaconic acid.

Comonomers of the general formula I which may be mentioned by way of example are (meth)acrylamide, preferably methacrylamide, and furthermore N,N-dimethyl(meth)acrylamide, N-methyl(meth)acrylamide, N-phenyl(meth)acrylamide and N,N-diethyl(meth)acrylamide and compounds of the general formula I.1

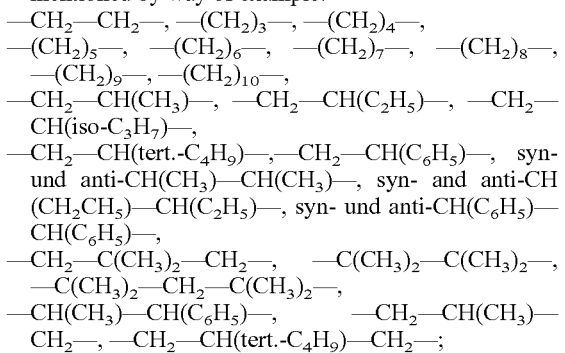

Comonomers of the general formula II which may be mentioned by way of example are methyl (meth)acrylate, n-butyl (meth)acrylate, isobutyl (meth)acrylate, sec-butyl (meth)acrylate, tert-butyl (meth)acrylate, ethyl (meth)acrylate, 2-ethylhexyl (meth)acrylate or mixtures thereof.

Comonomers of the general formula III which may be mentioned by way of example are allyl (meth)acrylate and methallyl (meth)acrylate, and furthermore ethylene glycol di(meth)acrylate, propane-1,3-diol di(meth)acrylate, butane-1,4-diol di(meth)acrylate, hexane-1,6-diol di(meth)acrylate, octane-1,8-diol di(meth)acrylate, decane-1-10-diol di(meth)acrylate and also dodecane-1,12-diol di(meth)acrylate.

Vinylaromatic compounds of the formula IV which may be mentioned by way of example are α-methylstyrene, para-methylstyrene, α-n-butylstyrene, para-n-butylstyrene, 4-n-decylstyrene and in particular styrene.

In an embodiment of the present invention, the mean particle diameter (number average) of at least one copolymer according to the invention is in the range from 70 to 300 nm, preferably up to 200 nm.

The glass transition temperature $T_g$, for example determinable according to ASTM 3418/82, of copolymers according to the invention is 15° C. or lower. The glass transition temperature $T_g$ of copolymers according to the invention is preferably in the range from −60° C. to 15° C., particularly preferably in the range from −50° C. to +10° C., very particularly preferably in the range from −45° C. to −5° C.

The copolymers according to the invention are as a rule random copolymers.

Copolymers according to the invention can be completely or partly neutralized with alkali or ammonia alkali being understood to mean, for example, $Li^+$, $Rb^+$ or $Cs^+$ and in particular $K^+$ and $Na^+$. Ammonium is to be understood as meaning not only $NH_4^+$ but also substituted ammonium ions, such as, for example, alkylammonium, dialkylammonium, trialkylammonium, tetraalkylammonium, where alkyl may be identical or different and is selected from $C_1$-$C_{10}$-alkyl, unsubstituted or monosubstituted or polysubstituted by, for example, hydroxyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl, particularly preferably $C_1$-$C_4$-alkyl, such as methyl, ethyl, n-propyl, isopropyl, n-butyl, isobutyl, sec-butyl and tert-butyl, 2-hydroxyethyl, 3-hydroxypropyl, 4-hydroxybutyl and 6-hydroxyhexyl.

The present invention furthermore relates to a process for the preparation of copolymers according to the invention. For carrying out the process according to the invention, (a) a total of from 3.5 to 20% by weight of polymerizable acid selected from
- (a1) at least one ethylenically unsaturated $C_3$-$C_{10}$-monocarboxylic acid and
- (a2) at least one ethylenically unsaturated $C_4$-$C_{10}$-dicarboxylic acid or its anhydrides, (b) from 4 to 10% by weight, preferably from 2 to 9% by weight and particularly preferably from 3 to 7% by weight, of at least one compound of the general formula I

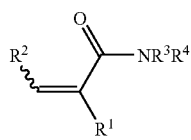

I the sum of (a) and (b) being in the range from 7.5 to 24% by weight, preferably in the range from 9 to 15% by weight, (c) from 60 to 92.5% by weight, preferably from 60 to 91% by weight, of at least one compound of the general formula II

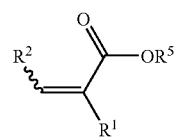

II (d) from 0 to 0.5% by weight, preferably from 0.01 to 0.4% by weight and particularly preferably from 0.05 to 0.2% by weight, of at least one compound of the general formula III

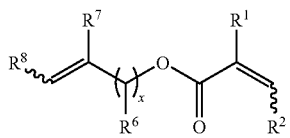

III (e) from 0 to 10% by weight, preferably from 0.1 to 7% by weight, of (meth)acrylonitrile, (f) from 0 to 10% by weight, preferably up to 8% by weight, of at least one conjugated diolefin, (g) from 0 to 10% by weight, preferably from 0.1 to 8% by weight, of at least one vinylaromatic compound of the general formula IV

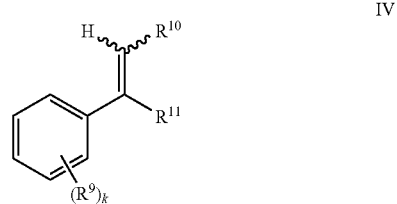

IV the variables being defined as above in the general formulae I to IV, are polymerized with one another by emulsion polymerization and, if appropriate, completely or partly neutralized with a basic alkali metal compound, ammonia or an amine.

Below, the term emulsion polymerization is also used when three or more comonomers are employed. Below, the term emulsion polymerization therefore also comprises emulsion copolymerizations.

Various emulsion polymerization procedures can be chosen for the preparation of a copolymer according to the invention, for example a batch process or semicontinuous or completely continuous processes, such as feed processes.

Seed procedures as described, for example, in EP 0 810 831 are also suitable. By means of a seed procedure, copolymers according to the invention and having a particularly well reproducible particle diameter distribution can be particularly well produced.

Usually, polymerization is effected using at least one initiator. At least one initiator may be a peroxide. Examples of suitable peroxides are alkali metal peroxodisulfates, such as, for example, sodium peroxodisulfate, ammonium peroxodisulfate, hydrogen peroxide, organic peroxides, such as diacetyl peroxide, di-tert-butyl peroxide, diamyl peroxide, dioctanoyl peroxide, didecanoyl peroxide, dilauroyl peroxide, dibenzoyl peroxide, bis(o-toluyl) peroxide, succinyl peroxide, tert-butyl peracetate, tert-butyl permaleate, tert-butyl perisobutyrate, tert-butyl perpivalate, tert-butyl peroctanoate, tert-butyl perneodecanoate, tert-butyl perbenzoate, di-tert-butyl peroxide, tert-butyl hydroperoxide, cumyl hydroperoxide, tert-butyl peroxy-2-ethylhexanoate and diisopropyl peroxydicarbamate. Azo compounds, such as, for example, azobisisobutyronitrile, azobis(2-amidopropane) dihydrochloride and 2,2'-azobis(2-methylbutyronitrile), are also suitable.

Redox initiators are likewise suitable, for example comprising peroxides and an oxidizable sulfur compound. Systems comprising acetonebisulfite and organic peroxide, such as tert-$C_4H_9$—OOH, $Na_2S_2O_5$ (sodium disulfite), and organic peroxides, such as tert-$C_4H_9$—OOH or HO—$CH_2SO_2Na$, and organic peroxide, such as tert-$C_4H_9$—OOH, are very particularly preferred. Systems such as, for example, ascorbic acid/$H_2O_2$, are also particularly preferred.

Temperatures in the range from 20 to 105° C., preferably from 55 to 100° C., can be chosen as the polymerization temperature or temperature at which the copolymerization is carried out. The chosen temperature is dependent on the decomposition characteristic of the initiator used or of the initiators used Temperatures in the range from 10 to 105° C., preferably from 20 to 50° C., can be chosen as the temperature at which the subsequent neutralization is carried out.

The pressure conditions are in general not critical and, for example, pressures in the range from atmospheric pressure to 10 bar are suitable.

It is possible to use at least one emulsifier, which may be anionic, cationic or nonionic.

Customary nonionic emulsifiers are, for example, ethoxylated mono-, di- and trialkylphenols (degree of ethoxylation: from 3 to 50, alkyl radical: $C_4$-$C_{12}$) and ethoxylated fatty alcohols (degree of ethoxylation: from 3 to 80; alkyl radical: $C_8$-$C_{36}$). Examples are the Lutensol® grades from BASF Aktiengesellschaft and the Triton® grades from Union Carbide.

Conventional anionic emulsifiers are, for example, alkali metal and ammonium salts of alkylsulfates (alkyl radical: $C_8$ to $C_{12}$), of sulfuric monoesters of ethoxylated alkanols (degree of ethoxylation: from 4 to 30, alkyl radical: $C_{12}$-$C_{18}$) and of ethoxylated alkylphenols (degree of ethoxylation: from 3 to 50, alkyl radical: $C_4$-$C_{12}$), of alkanesulfonic acids (alkyl radical: $C_{12}$-$C_{18}$) and of alkylarylsulfonic acids (alkyl radical: $C_9$-$C_{18}$).

Suitable cationic emulsifiers are as a rule primary, secondary, tertiary or quaternary ammonium salts having $C_6$-$C_{18}$-alkyl-, $C_6$-$C_{18}$-aralkyl or heterocyclic radicals, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts. Dodecylammonium acetate or the corresponding hydrochloride, the chlorides or acetates of various 2-(N,N,N-trimethylammonium)ethylparaffin acid esters, N-cetylpyridinium chloride, N-laurylpyridinium sulfate and N-cetyl-N,N,N-trimethylammonium bromide, N-dodecyl-N,N-trimethylammonium bromide, N,N-distearyl-N,N-dimethylammonium chloride and the Gemini surfactant N,N'-(lauryldimethyl)ethylenediamine dibromide may be mentioned by way of example. Numerous further examples are to be found in H. Stache, *Tensid-Taschenbuch*, Carl-Hanser-Verlag, Munich, Vienna, 1981, and in McCutcheon's, *Emulsifiers & Detergents*, MC Publishing Company, Glen Rock, 1989.

Further additives which are customary in emulsion polymerization, for example glycols, polyethylene glycol, protective colloids and buffer/pH regulators, can of course be added to the reaction mixture.

For example, a duration in the range from 30 minutes to 12 hours, preferably from 2 to 5 hours, can be chosen as a duration for the emulsion polymerization.

After the actual copolymerization, deodorization may be effected, for example by adding an initiator which is identical or different from the initiator used in the actual copolymerization.

In an embodiment of the present invention, the copolymerization takes place substantially completely. The composition of copolymers according to the invention does not differ measurably from the composition of the comonomers.

In an embodiment of the present invention the process according to the invention is carried out as a one-stage process In the context of the present invention, one-stage process is to be understood as meaning, for example, batch processes and feed processes in which a proportion of the comonomers may be initially taken and proportions of the comonomers are added during the copolymerization (feed), the composition of the feed with respect to the comonomers remaining substantially constant during the copolymerization.

In another embodiment of the present invention, the process according to the invention is carried out as a stepwise procedure. In the context of the present invention, this is to be understood as meaning continuous or batchwise feed processes in which the composition of the feed changes during the emulsion polymerization.

Copolymers according to the invention which are prepared by the process according to the invention are usually obtained in the form of aqueous dispersions, to which the present invention likewise relates and from which the copolymers according to the invention can be isolated by methods known per se, such as, for example, evaporation of the water.

Dispersions according to the invention comprise at least one copolymer according to the invention.

In an embodiment of the present invention, the mean diameter (number average) of solid particles in aqueous dispersions according to the invention is in the range from 70 to 300 nm, preferably up to 200 nm, determined, for example, by quasielastic light scattering (QELS). Suitable methods of measurement are described, for example, in ISO13321 and start from aqueous dispersions according to the invention which are highly diluted with water and have a solids content of 0.005% by weight or less, In an embodiment of the present invention, dispersions according to the invention have a solids content in the range from 5 to 60% by weight, preferably from 20 to 50% by weight, particularly preferably from 25 to 40% by weight.

In a special embodiment of the present invention, dispersions according to the invention have a pH in the range from 2 to 9.

In a special embodiment of the present invention, dispersions according to the invention have a pH in the range from 2 to 6, preferably in the range from 3 to 4. These are preferably dispersions according to the invention which comprise unneutralized copolymer according to the invention.

In another special embodiment of the present invention, dispersions according to the invention have a pH in the range from 6 to 9, preferably in the range from 6.5 to 8.

These are preferably dispersions according to the invention which comprise partly or completely neutralized copolymer according to the invention.

In an embodiment of the present invention, dispersions according to the invention comprise no further crosslinking agent.

In an embodiment of the present invention, a latent crosslinking agent may be added to the dispersions according to the invention, for example in the range from 0.01 to 1.5% by weight, preferably up to 1.25% by weight, based on solids of the dispersion according to the invention.

Suitable latent crosslinking agents are chosen, for example, from magnesium, calcium and zinc compounds.

Preferred calcium compounds are, for example, $Ca(OH)_2$ CaO.aq and CaO. Preferred magnesium compounds are $Mg(OH)_2$, basic magnesium carbonates, such as, for example, $MgCO_3.Mg(OH)_2.H_2O$, and in particular $MgCl_2.6 H_2O$.

Preferred zinc compounds are, for example, zinc oxide, ZnO.aq and tetraamminezinc complex salts are preferred zinc compounds. $[Zn(NH_3)_4]CO_3$, $[Zn(NH_3)_4](HCO_3)_2$ and $[Zn(NH_3)_4]SO_4$ are particularly preferred.

In an embodiment of the present invention, at least one latent crosslinking agent is added to dispersions according to the invention after the end of the copolymerization.

In another embodiment of the present invention, no latent crosslinking agent is added to dispersions according to the invention. This embodiment is possible when (d) is chosen to be >0% by weight, i.e. copolymerization is effected with at least one compound of the general formula III.

In a further embodiment of the present invention, at least one reactive crosslinking agent is added to dispersions according to the invention, preferably before use, for example in the range from 0.01 to 10% by weight, preferably up to 1.5% by weight, based on solids of the dispersion according to the invention, which reactive crosslinking agent is chosen, for example, from isocyanates, aziridines and epoxides. Trimethylpropane tris-beta-aziridinopropionate and isocyanate from EP-A 0 697 424, example 2, are particularly preferred.

In a further embodiment of the present invention, (d) is chosen to be >0, i.e. copolymerization is effected with at least one compound of the general formula III, and at least one reactive crosslinking agent or at least one latent crosslinking agent is added to the dispersion according to the invention.

The present invention furthermore relates to the use of aqueous dispersions according to the invention for coating flexible substrates. The present invention furthermore relates to a process for coating flexible substrates using aqueous dispersions according to the invention, also referred to below as coating process according to the invention, and the present invention furthermore relates to coated flexible substrates obtainable by a coating process according to the invention.

In the context of the present invention flexible substrates are, for example, textile and in particular leather and imitation leathers.

In the context of the present invention, leather is to be understood as meaning pretanned, tanned and, if appropriate, retanned leather or correspondingly processed synthetic substitute material, which may already have been treated with at least one dye during at least one tanning step. In the context of the present invention, leather may already have been rendered water repellent or fatliquored.

Imitation leathers are, for example, fiber structures, such as, for example, wovens and nonwovens, which are bound with the aid of binders. Fiber structures comprising tanned leather fibers, for example from buffing wastes and/or shavings, as obtained during leather production, may be mentioned by way of example.

For carrying out the coating process according to the invention, it is advantageous to adopt a procedure in which flexible substrates are brought into contact with at east one formulation according to the invention and then thermally treated. For example, leather can be treated with at least one aqueous liquor which comprises at least one formulation according to the invention, and leather treated in this manner can be dried in one or more continuous drying tunnels at air temperatures of from 60 to 150° C., preferably from 80 to 110° C. The still warm, finished leathers are then stacked one on top of the other, usually grain side on grain side and flesh side on flesh side. If at least one formulation according to the invention has been used, it is observed that, in spite of the high weights of the stacked leathers, there is scarcely any adhesion of the finished sides of the lower leather pieces.

In another embodiment of the present invention, the coating process according to the invention is a process for the finishing of leather. The object of finishing of leather, also referred to as coating of leather, is to give leather the desired appearance, especially haptic properties and fastnesses during use, such as, for example, flexing endurance, amine resistance, wet and dry rub fastness and water resistance.

In one embodiment, the process according to the invention for coating flexible substrates starts from pretanned, tanned and, if appropriate, retanned leather which may already have been rendered water repellent and dyed in a manner known per se.

First, at least one bottoming dispersion or—if a two-coat bottoming structure is desired—first an adhesive bottoming coat and then the bottoming dispersion, which in each case may comprise one or more aqueous dispersions according to the invention, is or are applied to the leathers to be coated in an amount such that from about 5 to 100 g, preferably from 10 to 50 g/m², of solid are applied per m² of leather surface. The application can be effected by methods known per se, for example roll coating, spreading, spraying, airless spraying, printing, lamination, application with a plush pad, brushing, casting or atomizing. The leather treated in this manner can then be dried, for example at a temperature in the range from 30 to 150° C., preferably from 80 to 120° C. The application of at least one bottoming dispersion can be effected in one or more steps which can be carried out identically or differently and in each case can be interrupted by intermediate drying at the abovementioned temperatures.

Bottoming dispersions which are used according to the invention are also referred to below as bottoming dispersions according to the invention are usually aqueous. They may comprise further, nonaqueous solvents, such as, for example, ethylene glycol, N-methylpyrrolidone, 1-methoxypropan-2-ol, 2-methoxypropan-1-ol, butylglycol (2-butoxyethanol), butyldiglycol (2-(2-butoxyethoxy)ethanol and propylene carbonate. In a preferred embodiment, bottoming dispersions according to the invention comprise the following components:

α1) at least one aqueous dispersion according to the invention, for automotive leather, a mixture with a urethane binder may be of further advantage, β1) at least one wax, such as, for example, oxidized polyethylene wax, carnauba wax or montan wax, for example preferably from 1 to 15% by weight, γ1) optionally at least one biocide, for example 1,2-benzisothiazolin-3-one ("BIT") (commercially available as Proxel® grades from Avecia Lim.) and the alkali metal salts thereof; other suitable biocides are 2-methyl-2H-isothiazol-3-one ("MIT") and 5-chloro-2-methyl-2H-isothiazol-3-one ("CIT"). In general, from 10 to 150 ppm of biocide are sufficient. Particularly when at least one zinc compound is used as a latent crosslinking agent, the use of biocides can be dispensed with.

Bottoming dispersions may furthermore comprise at least one filler and detackifier. For example, aqueous formulations comprising fatty esters, proteins and inorganic filler, which may be selected from amorphous silica, silicates and clay minerals, are suitable.

Before the application, bottoming dispersion according to the invention can be mixed with at least one pigment preparation, it being possible to choose pigments from inorganic and organic pigments, for example azo pigments, anthraquinone pigments, azophosphine pigments, thioindigo pigments, dioxazine pigments, naphthalenetetracarboxylic pigments, perylenetetracarboxylic acid pigments, copper-containing or copper-free phthalocyanine pigments, laked dyes, such as, for example, calcium, magnesium or aluminum lakes of dyes containing sulfo groups or carboxyl groups, and furthermore iron oxides, nickel-chromium compounds, silicas, aluminas, ultramarine, spinels and titanium dioxides.

In the context of the present invention, pigment preparations may comprise one or more dispersants, surfactants, biocides and wetting agents and furthermore water in addition to pigment. In the context of the present invention, pigment preparations may have a solids content in the range from 5 to 60% by weight.

If bottom dispersion according to the invention is mixed with pigment preparation, the ratio may be chosen within wide ranges. For example, the ratios may be chosen so that the solids contents of bottoming dispersion according to the invention and pigment preparation are from 1:1 to 30:1.

Bottoming dispersions according to the invention may have a solids content of from 10 to 60% by weight, preferably from 20 to 50% by weight.

A top coat can then be applied by methods known per se, The top coat may consist of conventional components.

In an embodiment of the present invention, the top coat comprises:

α2) at least one aqueous dispersion according to the invention; for automotive leather, a mixture with a polyurethane binder may be of further advantage, ε2) optionally at least one thickener, based in each case on the total mass of top coat.

In a preferred embodiment of the present invention, the top coat comprises at least one binder whose hardness is greater than the hardness of the bottom coat.

Before the application, the top coat according to the invention can be mixed with at least one pigment preparation, pigments and pigment preparations being as defined above.

If top coat according to the invention is mixed with pigment preparation, the ratios can be chosen within wide ranges. For example, the ratios can be chosen so that the solids contents of top coat according to the invention and pigment preparation are from 1:1 to 30:1.

A season, also referred to as seasoning dispersion, can then be applied, from 2 to 30 g of season per $m^2$ of leather surface being applied, the amount/$m^2$ of season being adapted to the intended use of the leather and the data in g/$m^2$ being based in each case on the solids content of the season. Thus, from 2 to 15 g/$m^2$ are preferred for furniture leather and from 5 to 30 g/$m^2$ for leather for automotive parts. The season or topcoat serves for protecting the leather and, in addition to high flexibility, should also ensure good scratch resistance, oil resistance and water resistance. Depending on the desired article, it should have gloss or a matt finish, i.e. it is also possible to add dulling agents. For example, seasons may comprise: formulations of at least one acrylate- or polyurethane-based binder, a crosslinking agent, protein, nitrocellulose emulsion, fillers based on either organic or inorganic dulling agents, silicone wax, fatty esters and/or fatty acids.

Seasoning dispersions according to the invention may comprise further binders in addition to aqueous dispersion according to the invention. For automotive leather, a mixture with a polyurethane binder may be of further advantage, for example, a polyurethane dispersion, prepared according to DE-A 42 31 034 or DE-A 40 03 442.

Before the application, seasoning dispersion according to the invention can be mixed with at least one pigment preparation, pigments and pigment preparations being defined as above.

If seasoning dispersion according to the invention is mixed with pigment preparation, the ratios can be chosen within wide ranges. For example, the ratios can be chosen so that the solids contents of seasoning dispersion according to the invention and pigment preparation are from 5:1 to 100:1.

Top coats and seasoning dispersions may comprise one or more thickeners. Crosslinkable copolymers based on acrylic acid and acrylamide and thickeners based on polyurethane or polyvinylpyrrolidone or acrylate (co)polymers may be mentioned by way of example. Furthermore, associative thickeners, for example based on hydrophobic/hydrophilic polyurethanes, polyureas and polyetherpolyols, are suitable.

In the process according to the invention for finishing of leather, at least one aqueous dispersion according to the invention is used in at least one step—bottoming, application of the top coat and seasoning.

Advantageously, a season in the form of a dispersion, also referred to as seasoning dispersion in the context of the present invention, can be applied, from about 10 to 30 g of seasoning dispersion being applied per $m^2$ of leather surface.

In an embodiment of the present invention, seasoning dispersion according to the invention comprises α3) at least one dispersion according to the invention, β3) optionally at least one wax, such as, for example, oxidized polyethylene wax or montan wax, suitable amounts being, for example, from 20 to 70% by weight, γ3) optionally at least one biocide, for example 1,2-benzoisothiazolin-3-one ("BIT") (commercially available as Proxel® grades from Avecia Lim.) and alkali metal salts thereof; other suitable biocides are 2-methyl-2H-isothiazol-3-one ("MIT") and 5-chloro-2-methyl-2H-isothiazol-3-one ("CIT"); in general from 10 to 150 ppm of biocide are sufficient, δ3) at least one dulling agent.

Of course, seasoning dispersions may comprise further conventional components, for example shellac, or one or more further pigments or nitrocellulose.

The thickeners used may be natural or synthetic thickeners. The use of synthetic thickeners is preferred, for example selected from the class of compounds consisting of the acrylic acid-rich copolymer dispersions and the hydrophobically modified polyacrylic acid copolymers and preferably the nonionic hydrophobically/hydrophilically modified polyethers, urethanes and ureas, disclosed, for example, in J. Bieleman, Additives for Coatings, Wiley-VCH, Weinheim 2000, and additionally Proceedings 7th Nürnberg Congress of Coatings Technology 2003 part II, in particular F. Sauer, II.2, page 161, M. Schmidtchen, II.4, page 173, I. Mussard, II.4, page 173, K. Dvizok, II.5, page 161, and in references cited in the abovementioned.

After application of the season, drying can be effected under conventional conditions, for example at temperatures in the range from 60 to 80° C., and then ironing can be effected, for example, at temperatures in the range from 90 to 160° C. It is also possible to effect hydraulic plating, for example at temperatures in the range from 70 to 100° C. Conventional apparatuses for plating are suitable, such as, for example, continuous plating machines.

In the context of the present invention, at least one coat selected from bottom coats top coat and season is prepared, using at least one aqueous dispersion according to the invention. Preferably, however, at least two, particularly preferably at least three, coats are prepared using at least one aqueous dispersion according to the invention.

The present invention furthermore relates to a leather finish comprising:

in the range from 30 to 80% by weight, preferably from 50 to 75% by weight, of at least one copolymer according to the invention, in the range from 15 to 40% by weight, preferably from 20 to 35% by weight, of at least one filler, in the range from 0.1 to 3% by weight of at least one thickener, in the range from 0.1 to 10% by weight, preferably from 0.2 to 5% by weight, of a crosslinking agent, in the range from 0 to 1% by weight, preferably from 0.1 to 0.3% by weight, of at least one biocide, the data in % by weight relate in each case to the solids and being based on the solids content of the leather finish according to the invention.

For example, the abovementioned latent crosslinking agents and reactive crosslinking agents and biocides can be used as the crosslinking agent and as the biocide, respectively. If (d) is chosen to be >0% by weight, the addition of reactive crosslinking agent or latent crosslinking agent can be dispensed with.

Fillers used may be mixtures which comprise:

in the range from 20 to 30% by weight of one or more inorganic solid compounds, e.g. amorphous silica, kaolin, bentonite, for example having a mean particle diameter in the range from 20 nm to 20 µm, preferably in the range from 2 µm to 15 µm, in the range from 25 to 50% by weight of one or more organic oils and/or fats, e.g, triolein, lanolin, neatsfoot oil, peanut oil, paraffin, in the range from 0 to 40% by weight of protein, e.g. casein, protein-free fillers preferably being used;

in the range from 5 to 15% by weight of one or more surface-active compounds, for example one or more surfactants, e.g.

organic acids, e.g. oleic acid, stearic acid, preferably as the ammonium salt, $C_{10}$-$C_{40}$-alkanols, if appropriate having a degree of ethoxylation of from one to 30, cation-active surfactants, such as, for example, esters of stearic acid quaternized with triethanolamine, and/or polymeric dispersants, such as, for example, copolymers of acrylamidosulfonic acid sodium salt with, for example, (meth)acrylamide, and in the range from 0 to 7% by weight, preferably from 0.1 to 5% by weight, of other assistants, such as, for example, biocides, which are chosen as above, inorganic and organic bases, and water, percentages by weight being based in each case on the dry mass of the relevant filler.

Fillers may have a pH of, for example, in the range from 6 to 10.

A leather finish according to the invention may have a solids content in the range from 10 to 40% by weight, preferably from 15 to 30% by weight.

In an embodiment of the present invention, a leather finish according to the invention has a kinematic viscosity in the range from 20 to 40 s, preferably in the range from 25 to 35 s, determined, for example, according to DIN 53211.

A leather finish according to the invention can be used, for example, as a bottoming dispersion and, in a form diluted with water, very particularly preferably as a seasoning dispersion.

The present invention furthermore relates to flexible substrates, in particular leather and imitation leathers, obtainable by using copolymers according to the invention. The present invention furthermore relates to flexible substrates, in particular leather and imitation leathers, obtainable by the coating process according to the invention.

Flexible substrates according to the invention have excellent performance characteristics; for example, they are soft, do not build up in piles and load one another and can be stacked without sticking. Leathers and imitation leathers according to the invention can moreover be particularly readily embossed, for example by means of static hydraulic presses and "sharp" embossing plates, for example of the Madras type, for example at temperatures in the range from 80 to 120° C. and in particular at temperatures in the range from 90° C. to 110° C., the temperature being based in each case on the embossing plate, and for hold times in the range from 1 to 5, preferably up to 4, seconds. In continuous embossing machines, imitation leathers according to the invention and leathers according to the invention can be embossed at temperatures in the range from 100 to 140° C., preferably from 110 to 125° C., and pressures of 200-250 bar.

Coated flexible substrates according to the invention and in particular leather according to the invention are moreover formaldehyde-free in the conventional tests, i.e. the formaldehyde content is less than 10 ppm in conventional tests.

The present invention furthermore relates to a process for the production of shoes, apparel, pieces of furniture or automotive parts using coated flexible substrates according to the invention, in particular using leather according to the invention or imitation leathers according to the invention. The present invention furthermore relates to furniture, for example seats and sofas, and automotive parts, for example seats, steering wheels, doors, center consoles and dashboards, produced in each case using flexible substrates according to the invention and in particular using leather according to the invention or imitation leathers according to the invention.

The invention is explained by working examples.

General remarks: Demineralized water is understood as meaning water which has been freed from salts by conventional ion exchangers.

The glass transition temperatures $T_g$ were determined using a DSC apparatus from Mettler by the following method based on DIN 53765:

Weight taken: from 10 to 20 mg of copolymer dispersion in 40 µl standard aluminum crucible In the standard method for dispersions, the glass transition temperature $T_g$ (midpoint) is automatically determined in the second heat-up curve with the aid of an evaluation macro. Here, a blind curve measured beforehand using an empty crucible is subtracted.

The temperature curve corresponds to the applicable DIN standard DIN 53765.

The beginning of the measuring sequence is at 25° C. Heating is effected to 150° C. (i.e. beyond $T_g$) at 20° C./min, the temperature of 150° C. is kept isothermally for 3 minutes and cooling is then effected to −110° C. at 20° C./min. After a further 7 minutes, isothermal holding of the temperature at −110° C., heating to 150° C. is effected at 20° C./min (this section is evaluated) and the temperature is kept at 150° C. for 5 minutes.

I. Preparation of Formulations According to the Invention

I.1 Preparation of Copolymer P1 According to the Invention

The following mixtures were prepared, data in % by weight being based in each case on the sum of all comonomers:

Mixture 1.1

| | | | |
|---|---|---|---|
| 1.4 g | of sodium pyrophosphate, | | |
| 35 g | of itaconic acid, | 2.5% | by weight |
| 84 g | of methacrylamide, dissolved in 476 g of water, | 6% | by weight |
| 56 g | of methacrylic acid | 4% | by weight |
| 805 g | of n-butyl acrylate, | 57.46% | by weight |
| 420 g | of ethyl acrylate | 30% | by weight |
| 1.05 g | of allyl methacrylate | 0.1% | by weight (rounded up) |
| 17.5 g | of sodium laurylsulfate, dissolved in 45 g of water, dispersed together in a further 150 ml of demineralized water. | | |

Mixture 1.2:

4.2 g of $Na_2S_2O_8$ (sodium peroxodisulfate), dissolved in 250 g of demineralized water Mixture 1.3:

6 g of a 70% by weight aqueous solution of tert-butyl hydroperoxide, diluted with a further 45 g of demineralized water.

Mixture 1.4

3.8 g of HO—CH$_2$—SO$_2$Na in 50 g of demineralized water

Mixture 1.5

250 g of an aqueous solution of [Zn(NH$_3$)$_4$](HCO$_3$)$_2$, diluted with 290 g of demineralized water.

The aqueous solution of [Zn(NH$_3$)$_4$](HCO$_3$)$_2$ had been prepared as follows:

920 g of demineralized water are initially taken and 157 g of ammonium bicarbonate are added with stirring. Stirring was effected for 30 minutes at room temperature. Thereafter, 100 g of zinc oxide were added and then 223 g of 25% by weight aqueous ammonia solution. Stirring was effected for a further 60 minutes at room temperature and filtration was carried out over a 100 µm net.

In a 5 l kettle having a stirrer, nitrogen connection and two metering apparatuses, 1050 g of demineralized water and 27.8 g of polystyrene seed having a mean particle diameter of 25 nm were initially taken. Nitrogen was blown through the initially taken mixture for 15 minutes while stirring, and the mixture was then heated to 80° C. During the copolymerization which now took place, the temperature was kept at 80° C.

The metering of mixture 1.1 and metering of mixture 1.2 were begun simultaneously, the metering of mixture 1.1 being carried out in the course of 120 minutes and the metering of mixture 1.2 in the course of 135 minutes. After the end of the metering of mixture 1.2, stirring was continued for 30 minutes. Mixture 1.3 and mixture 1.4 were then added simultaneously over a period of 90 minutes. Thereafter, cooling was effected over 20 minutes and mixture 1.5 was added dropwise at 20° C. in the course of 30 minutes. Stirring was effected for a further 10 minutes and filtration was carried out over a 125 µm net.

Aqueous dispersion D1.1 according to the invention, comprising 35.4% by weight of copolymer CP1.1 according to the invention, was obtained. The pH was 7.8, the light transmittance was 86, the viscosity was 45 mPa·s (determined according to DIN EN ISO 3219) and the glass transition temperature T$_g$ was −18° C.

I.2 to I.19. Preparation of Further Copolymers According to the Invention and Further Dispersants According to the Invention The procedure was as described under I.1, except that the mixtures were chosen as described in table 1.

In examples D1.4 to D1.8 and D1.19, Ca was introduced as Ca(OH)$_2$.

TABLE 1

Preparation and composition of copolymers according to the invention and aqueous dispersions according to the invention and of comparative polymer V1.16

| Copolymer | ItA | MAH | MAM | AM | n-BA | EA | EHA | AIMA | AN | AA | MAA | CA | S | T$_g$ [° C.] | Dispersion | Zn | Ca |
|---|---|---|---|---|---|---|---|---|---|---|---|---|---|---|---|---|---|
| CP1.1 | 2.5 | — | 6 | — | 57.5 | 30 | — | 0.075 | — | — | 4 | — | — | −18 | D1.1 | 1 | — |
| CP1.2 | 2.5 | — | 6 | — | — | 30 | 57.5 | 0.075 | — | — | 4 | — | — | −34 | D1.2 | 1 | — |
| CP1.3 | 2.5 | — | 6 | — | — | 30 | 57.5 | 0.075 | — | — | 4 | — | — | −35 | D1.3 | 1.25 | — |
| CP1.4 | 3 | — | 4 | — | 60 | 23 | — | 0.1 | 7 | — | 3 | — | — | −17 | D1.4 | — | 0.7 |
| CP1.5 | 4 | — | — | 3 | — | 22 | 61 | 0.15 | — | 2 | — | — | 8 | −31 | D1.5 | — | 0.8 |
| CP1.6 | 2.5 | — | 6 | — | 57.5 | 30 | — | 0.075 | — | — | 4 | — | — | −18 | D1.6 | — | 0.6 |
| CP1.7 | 2.5 | — | 6 | — | — | 30 | 57.5 | 0.075 | — | — | 4 | — | — | −34 | D1.7 | — | 0.6 |
| CP1.8 | 2.5 | — | 6 | — | — | 30 | 57.5 | 0.075 | — | — | 4 | — | — | −35 | D1.8 | — | 1 |
| CP1.9 | 2.5 | — | — | 5 | 58.5 | 30 | — | 0.075 | — | — | 4 | — | — | n.d. | D1.9 | 1 | — |
| CP1.10 | — | — | 6 | — | 58 | 30 | — | 0.075 | — | 3.5 | — | — | — | n.d. | D1.10 | 1 | — |
| CP1.11 | — | 2.2 | 6 | — | 57.8 | 30 | — | 0.075 | — | — | 4 | — | — | n.d. | D1.11 | 1 | — |
| CP1.12 | — | — | 6 | — | 58.3 | 30 | — | 0.075 | — | — | 4 | 1.7 | — | n.d. | D1.12 | 1 | — |
| CP1.13 | 8.5 | — | 6 | — | 55.5 | 30 | — | 0.075 | — | — | — | — | — | n.d. | D1.13 | 1 | — |
| CP1.14 | — | — | 6 | — | 60 | 29 | — | 0.075 | — | — | 5 | — | — | n.d. | D1.14 | 1 | — |
| CP1.15 | 2.5 | — | 6 | — | 59 | 30 | — | 0.075 | — | — | 2.5 | — | — | n.d. | D1.15 | 1 | — |
| CP1.16 | — | — | 6 | — | 60 | 30 | — | 0.075 | — | — | 4 | — | — | n.d. | D1.16 | 1 | — |
| CP1.17 | — | — | 6 | — | 60 | 29 | — | 0.075 | — | — | 5 | — | — | n.d. | D1.17 | 0.5 | — |
| CP1.18 | — | — | 6 | — | 60 | 30 | — | 0.075 | — | — | 4 | — | — | n.d. | D1.18 | 0.8 | — |
| CP1.19 | — | — | 6 | — | 60 | 30 | — | 0.075 | — | — | 4 | — | — | n.d. | D1.19 | — | 0.6 |
| CP1.20 | 1 | — | 6 | — | 59 | 30 | — | 0.075 | — | — | 4 | — | — | n.d. | D1.20 | 1 | — |
| CP1.21 | 2.5 | — | 6 | — | 57.5 | 30 | — | 0 | — | — | 4 | — | — | n.d. | D1.21 | 1 | — |
| CP1.22 | — | — | 6 | — | 60 | 30 | — | 0.075 | — | — | 4 | — | — | n.d. | D1.22 | 0.5 | — |
| CP1.23 | 2 | — | 6 | — | 58 | 30 | — | 0.075 | — | — | 4 | — | — | n.d. | D1.23 | 1 | — |
| CP1.24 | — | — | 6 | — | 60 | 29 | — | 0.075 | — | — | 5 | — | — | n.d. | D1.24 | 1 | — |
| CP1.25 | 2.5 | — | 6 | — | 57.5 | 30 | — | 0.075 | — | — | 4 | — | — | n.d. | D1.25 | 0.8 | — |
| CP1.26 | — | — | 5 | — | 59 | 30 | — | 0.075 | — | — | 4 | — | — | n.d. | D1.26 | 1.5 | — |
| CP1.27 | — | — | 5 | — | 59 | 30 | — | 0.05 | — | — | 4 | — | 2 MMA | n.d. | D1.27 | 1.5 | — |
| V1.28 | — | — | 2 | 2 AMol | 62 | — | — | — | — | — | 2 | — | 32 MMA | −5 | V-D1.28 | 1 | — |

All data of comonomers and Zn or Ca are expressed in % by weight and based on total copolymer according to the invention. All data of comonomers have been rounded off. The polystyrene seed is not included in any cases.

Abbreviations used: ItA: itaconic acid, MAM: methacrylamide, AM: acrylamide, n-BA: n-butyl acrylate, EA: ethyl acrylate, EHA: 2-ethylhexyl acrylate, AIMA: allyl methacrylate, AN: acrylonitrile, AA: acrylic acid, MAA: methacrylic acid, S: styrene, CA: (E)-crotonic acid, MAH: maleic anhydride, AMOL: methylolacrylamide, MMA: methacrylic methacrylate II. Preparation of a Leather Finish According to the Invention Leather finishes according to the invention were prepared by stirring the components mentioned below Components:
200 g of white pigment preparation according to DE 41 42 240 A1, example 3
100 g of filler (aqueous pasty mixture of fatty esters, pH 9, about 25% by weight solids content)
60 g of dulling agent, aqueous dispersion of amorphous silica, pH 9, 20% by weight solids content, dispersed with $C_{18}H_{37}$—$O(CH_2CH_2O)_{25}$—H
40 g of oil base, aqueous emulsion of a mixture of natural fats, pH 3, solids content 55%, with cationic fatty acid condensate, dispersed with cis-n-$CH_3(CH_2)_7$—CH=CH—$(CH_2)_7$—COO—$CH_2CH_2$—$N(CH_2CH_2OH)_3^+Cl^-$.
100 g of water
500 g of a dispersion according to the invention, as shown in table 1
2 g of a curing agent consisting of 90% by weight of trimethylolpropane trisbetaaziridinopropionate (cf. formula VI), 8% by weight of diacetone alcohol and 2% by weight of 1,4-diazabicyclo[2.2.2]octane, prepared by mixing diazabicyclo[2.2.2]octane with ethylenimine and then adding trimethylolpropane triacrylate.

VI

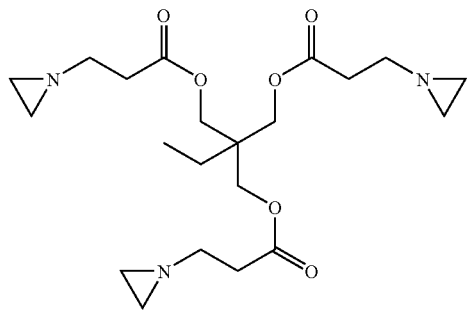

The leather finishes 2.1 to 2.27 according to the invention and comparative finish V2.28 were obtained.

III. Application of the Leather Finishes According to the Invention

The leathers used for the test were soft (furniture) upholstery leathers buffed on the grain side (for example 220-grade buffing paper).

One leather finish each according to the invention was applied to a leather sample by means of a roll coater by the counter-rotating method, and the amount of finish applied is 10±1 g/ft² (g/square foot).

The amounts applied were determined by subsequently weighing still moist pieces of leather of DIN A4 size.

All coats were dried three times in a drying tunnel at 100° C. (1 min pass). Embossing was then effected.

IV. Embossing of a Leather According to the Invention

The embossing was effected in the bottom coat by means of a hydraulic press with a plate preheated to 105° C. while maintaining the maximum pressure (220 bar) for two seconds. Sharp embossing plates of the "Madras" type, which, in the case of leather from the prior art, tended to cut through the already applied finish film, were employed.

The embossed leathers 4.1 to 4.15 according to the invention and the embossed comparative leather V4.16 were obtained.

The Following Were Evaluated

Tack: i.e. the extent to which the leather remained sticking to the plate after the press was raised. "No sticking" means that the leather remains resting on the counter-plate.

Embossed pattern: No "cutting through", i.e. no pressing through the film down to the leather surface so that the film tears and even fibers were detectable. A good level of embossing means that the pattern of the plate was ideally reproduced, resulting in the impression of a natural grain pattern which was also preserved after milling.

Softness: After milling of the leather, no hardening was detectable haptically in leather according to the invention, and the hand was round and elegant, as expected for high-quality leather articles.

The flexibility: was determined on the completely finished leather (i.e. including top coat) in the flexing test according to EN ISO 5402 (DIN 53 351, IUP 20) using the Bally flexometer (at least 50 000 flexes in the dry state and at least 20 000 flexes in the wet state without damage).

The results are reproduced in table 2.

TABLE 2

Investigations of performance characteristics of leathers according to the invention

| Dispersion | Leather finish | Embossed leather | Freedom from tack | Cutting through | Hand | Flexing test dry | wet |
|---|---|---|---|---|---|---|---|
| D1.1 | 2.1 | 4.1 | ++ | ++ | soft, elegant | + | ++ |
| D1.2 | 2.2 | 4.2 | ++ | ++ | excellent | ++ | ++ |
| D1.3 | 2.3 | 4.3 | ++ | ++ | soft, elegant | + | ++ |
| D1.4 | 2.4 | 4.4 | ++ | + | soft, elegant | + | ++ |
| D1.5 | 2.5 | 4.5 | ++ | + | soft, elegant | + | ++ |
| D1.6 | 2.6 | 4.6 | ++ | + | soft, elegant | + | ++ |
| D1.7 | 2.7 | 4.7 | ++ | + | excellent | ++ | ++ |
| D1.8 | 2.8 | 4.8 | ++ | + | soft, elegant | + | ++ |
| D1.9 | 2.9 | 4.9 | + | ++ | soft, elegant | ++ | + |
| D1.10 | 2.10 | 4.10 | + | + | soft, elegant | ++ | + |
| D1.11 | 2.11 | 4.11 | + | + | soft, elegant | 0 | ++ |
| D1.12 | 2.12 | 4.12 | 0 | ++ | soft, elegant | 0 | + |
| D1.13 | 2.13 | 4.13 | + | + | soft, elegant | 0 | + |
| D1.14 | 2.14 | 4.14 | + | ++ | excellent | + | + |
| D1.15 | 2.15 | 4.15 | + | + | soft, elegant | + | + |
| D1.16 | 2.16 | 4.16 | + | + | soft, elegant | ++ | ++ |
| D1.17 | 2.17 | 4.17 | + | + | soft, elegant | + | + |

TABLE 2-continued

Investigations of performance characteristics of leathers according to the invention

| Dispersion | Leather finish | Embossed leather | Freedom from tack | Cutting through | Hand | Flexing test dry | Flexing test wet |
|---|---|---|---|---|---|---|---|
| D1.18 | 2.18 | 4.18 | + | + | soft, elegant | + | + |
| D1.19 | 2.19 | 4.19 | + | 0 | soft, elegant | + | ++ |
| D1.20 | 2.20 | 4.20 | ++ | + | soft, elegant | + | ++ |
| D1.21 | 2.21 | 4.21 | + | ++ | soft, elegant | + | ++ |
| D1.22 | 2.22 | 4.22 | + | + | soft, elegant | ++ | + |
| D1.23 | 2.23 | 4.23 | ++ | + | soft, elegant | + | ++ |
| D1.24 | 2.24 | 4.24 | + | ++ | soft, very elegant | + | + |
| D1.25 | 2.25 | 4.25 | + | + | soft, elegant | ++ | ++ |
| D1.26 | 2.26 | 4.26 | ++ | ++ | excellent | ++ | + |
| D1.26 | 2.26 | 4.26 | ++ | ++ | excellent | ++ | + |
| D1.27 | 2.27 | 4.27 | ++ | ++ | excellent | ++ | + |
| V-D1.28 | V 28 | V 4.28 | 0 | − | noticeably hard | 0 | 0 |

We claim:

1. A copolymer prepared by copolymerization of
   (a) a total of from 3.5 to 20% by weight of at least one polymerizable acid selected from the group consisting of
      (a1) ethylenically unsaturated $C_3$-$C_{10}$-monocarboxylic acids,
      (a2) ethylenically unsaturated $C_4$-$C_{10}$-dicarboxylic acid or their anhydrides,
   (b) from 4 to 10% by weight of at least one compound of the general formula I

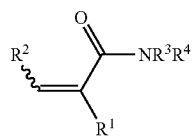

wherein the sum of (a) and (b) being in the range from 7.5 to 24% by weight,
   (c) from 60 to 92.5% by weight of at least one compound of the general formula II

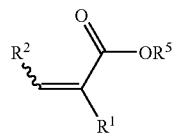

(d) from 0.01 to 0.5% by weight of at least one compound of the general formula III

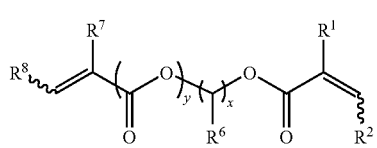

(e) from 0 to 10% by weight of (meth)acrylonitrile,
   (f) from 0 to 10% by weight of at least one conjugated diolefin,
   (g) from 0 to 10% by weight of at least one vinylaromatic compound of the general formula IV

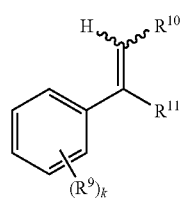

wherein the variables are defined as follows:
   $R^1$ and $R^2$ are identical or different and are selected from hydrogen and $C_1$-$C_{10}$-alkyl,
   $R^3$ and $R^4$ are identical or different and are selected from hydrogen, $C_1$-$C_{20}$-alkyl and phenyl, or
   or $R^3$ and $R^4$ together are $C_2$-$C_{10}$-alkylene, substituted or unsubstituted,
   $R^5$ is selected from $C_1$-$C_{20}$-alkyl and phenyl,
   $R^6$, $R^7$, $R^8$, $R^9$, $R^{10}$ and $R^{11}$ are identical or different and are selected from hydrogen and $C_1$-$C_{10}$-alkyl,
   x is an integer in the range from 0 to 12,
   y is selected from 0 and 1, wherein x is chosen to be not equal to 0 when y is 1,
   k is an integer in the range from 0 to 3,
   wherein the copolymer may be completely or partly neutralized with alkali or ammonium and
   data in % by weight being based in each case on the total copolymer weight.

2. The copolymer according to claim 1, wherein at least one ethylenically unsaturated $C_4$-$C_{10}$-dicarboxylic acid (a2) is itaconic acid.

3. The copolymer according to claim 1, wherein $R^1$ and $R^2$ are each hydrogen or methyl.

4. The copolymer according to any of claims 1, wherein the copolymer is prepared by a one-stage process.

5. An aqueous dispersion comprising at least one copolymer according to claim 1.

6. The aqueous dispersion according to claim 5, wherein the pH in the range from 2 to 8.5.

7. The aqueous dispersion according to claim 5, comprising at least one crosslinking agent.

8. The aqueous dispersion according to claim 7, wherein the crosslinking agent is at least one crosslinking agent selected from the group consisting of a zinc, calcium and magnesium compound.

9. A process for coating substrates wherein the sustrate is brought into contact with at least one aqueous dispersion according to claim 7 and then the substrate having been contacted with the at least one aqueous dispersion is thermally treated.

10. The process according to claim 9, wherein the substrates are leather or imitation leathers.

11. A coated substrate obtained by the process according to claim 9.

12. A process for the production of articles selected from the group consisting of shoes, apparel, pieces of furniture or automotive parts comprising coated flexible substrate according to claim 9 and incorporating the coated flexible substrate into the article.

13. A piece of furniture obtained by a process according to claim 12.

14. An automotive part obtained by a process according to claim 12.

15. A process for the preparation of copolymers, wherein
(a) a total of from 3.5 to 20% by weight of at least one polymerizabie acid selected from the group consisting of
   (a1) ethylenically unsaturated $C_3$-$C_{10}$-monocarboxylic acids and
   (a2) ethylenically unsaturated $C_3$-$C_{10}$-dicarboxylic acids and their anhydrides,
(b) from 4 to 10% by weight of at least one compound of the general formula I

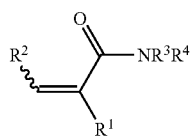

I wherein the sum of (a) and (b) is in the range from 7.5 to 24% by weight
(c) from 60 to 92.5% by weight of at least one compound of the general formula II

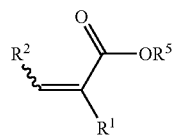

II (d) from 0.01 to 0.5% by weight of at least one compound of the general formula III

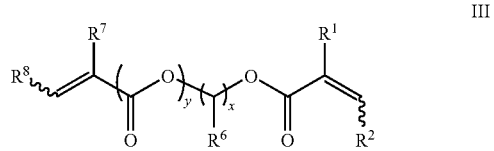

III (e) from 0 to 10% by weight of (meth)acrylonitrile,
(f) from 0 to 10% by weight of at least one conjugated diolefin, and
(g) from 0 to 10% by weight of at least one vinylaromatic compound of the general formula IV

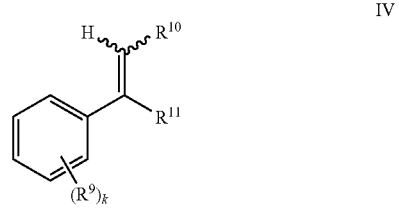

IV wherein the variables being defined as follows:
$R^1$ and $R^2$ are identical or different and are selected from hydrogen and $C_1$-$C_{10}$-alkyl,
$R^3$ and $R^4$ are identical or different and are selected from hydrogen, $C_1$-$C_{20}$-alkyl and phenyl, or $R^3$ and $R^4$ together are $C_2$-10-alkylene, substituted or unsubstituted,
$R^5$ is selected from $C_1$-$C_{20}$-alkyl and phenyl,
$R^6$, $R^7$, $R^8$, $R^9$, $R^{10}$ and $R^{11}$ are identical or different and are selected from hydrogen and $C_1$-$C_{10}$-alkyl,
x is an integer in the range from 0 to 12,
y is selected from 0 and 1, x being chosen to be not equal to 0 when y is 1,
k is an integer in the range from 0 to 3,
are copolymerized with one another by emulsion polymerization
and, optionally, completely or partly neutralized with a basic alkali metal compound, ammonia or an amine,
wherein data in % by weight is based in each case on the total copolymer weight.

16. The process according to claim 15, wherein the copolymerization is carried out at temperatures in the range from 55 to 100° C.

* * * * *

UNITED STATES PATENT AND TRADEMARK OFFICE
CERTIFICATE OF CORRECTION

PATENT NO. : 7,601,397 B2  Page 1 of 1
APPLICATION NO. : 11/569685
DATED : October 13, 2009
INVENTOR(S) : Schoepke et al.

It is certified that error appears in the above-identified patent and that said Letters Patent is hereby corrected as shown below:

On the title page, Item (73), the Assignee's information is incorrect. Item (73) should read:

-- (73) Assignee:  BASF Aktiengesellschaft, Ludwigshafen (DE) --

Signed and Sealed this

Eighth Day of December, 2009

David J. Kappos
*Director of the United States Patent and Trademark Office*